(12) United States Patent
Hiroi et al.

(10) Patent No.: US 11,107,276 B2
(45) Date of Patent: Aug. 31, 2021

(54) SCALING VOXELS IN A VIRTUAL SPACE (71) Applicant: Sony Interactive Entertainment Inc., Tokyo (JP)

(72) Inventors: Jun Hiroi, Tokyo (JP); Osamu Ota, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/482,529

(22) PCT Filed: Mar. 23, 2017

(86) PCT No.: PCT/JP2017/011778
§ 371 (c)(1),
(2) Date: Jul. 31, 2019

(87) PCT Pub. No.: WO2018/173207
PCT Pub. Date: Sep. 27, 2018

(65) Prior Publication Data
US 2020/0265640 A1    Aug. 20, 2020

(51) Int. Cl.
*G06T 15/08*  (2011.01)
*G06T 17/10*  (2006.01)
(52) U.S. Cl.
CPC .............. *G06T 17/10* (2013.01); *G06T 15/08* (2013.01)
(58) Field of Classification Search
None
See application file for complete search history.

(56) References Cited

U.S. PATENT DOCUMENTS

| 9,600,929 | B1 * | 3/2017 | Young | G06T 1/60 |
| 10,109,059 | B1 * | 10/2018 | Klein | G01S 17/89 |
| 10,943,395 | B1 | 3/2021 | Green | |
| 2004/0021661 | A1 * | 2/2004 | Tsuda | G06T 13/20 |
| | | | | 345/419 |
| 2004/0170247 | A1 | 9/2004 | Poole | |

(Continued)

FOREIGN PATENT DOCUMENTS

| JP | 2004152164 A | 5/2004 |
| JP | 2010165344 A | 7/2010 |

OTHER PUBLICATIONS

Ernst, Th, J. Hennig, D. Ott, and H. Friedburg. "The importance of the voxel size in clinical 1H spectroscopy of the human brain." NMR in Biomedicine 2, No. 5-6 (Dec. 2, 1989): 216-224. (Year: 1989).*

(Continued)

*Primary Examiner* — Steven Z Elbinger
(74) *Attorney, Agent, or Firm* — Matthew B. Dernier, Esq.

(57) ABSTRACT

An information processing apparatus acquires, for each of a plurality of unit portions included in an object, volume element data indicating a position in a virtual space where a unit volume element corresponding to the unit portion is to be arranged, arranges, on the basis of the volume element data, a plurality of the unit volume elements in the virtual space, draws a spatial image representing how the virtual space in which the unit volume elements are arranged looks, and changes a size of the unit volume elements on the basis of a manner in which the unit volume elements are arranged in the spatial image.

7 Claims, 6 Drawing Sheets

(56) References Cited

U.S. PATENT DOCUMENTS

| | | | |
|---|---|---|---|
| 2006/0290695 A1* | 12/2006 | Salomie | G06T 17/20 |
| | | | 345/420 |
| 2009/0185731 A1* | 7/2009 | Ray | G06T 7/149 |
| | | | 382/131 |
| 2010/0144436 A1 | 6/2010 | Marks | |
| 2011/0097007 A1* | 4/2011 | Zeng | A61B 6/5258 |
| | | | 382/260 |
| 2015/0199816 A1 | 7/2015 | Freeman | |
| 2017/0116497 A1* | 4/2017 | Georgescu | G16H 50/70 |
| 2017/0285732 A1 | 10/2017 | Daly | |
| 2018/0061123 A1* | 3/2018 | Owechko | G06T 7/344 |
| 2019/0279428 A1 | 1/2019 | Mack | |

OTHER PUBLICATIONS

International Search Report for corresponding PCT Application No. PCT/JP2017/011778, 2 pages, dated Jun. 13, 2017.
International Preliminary Report on Patentability and Written Opinion for corresponding Application PCT/JP2017/011778, 13 pages, dated Oct. 3, 2019.
International Search Report for related PCT Application No. PCT/JP2017/011777, 2 pages, dated Jun. 13, 2017.
International Preliminary Report on Patentability and Written Opinion for related Application PCT/JP2017/011777, 13 pages, dated Oct. 3, 2019.
Hasenfratz et al., "A Real-Time System for Full Body Interaction with Virtual Worlds", Virtual Environments 2004—10th Eurographics Symposium on Virtual Environments, pp. 147-156, Jun. 1, 2004.
Extended European Search Report for corresponding to EP Application No. 17902112.6, 19 pages, dated Jan. 28, 2021.
Daniel Knoblauch, et al., "Region of Interest volumetric visual hull refinement" Proceeding of the 17th ACM Symposium on Virtual Reality Software and Technology, pp. 143-150 Nov. 22, 2010.
Jun-Wei Hsieh, et al., "Segmentation of Human Body Parts Using Deformable Triangulation" IEEE Transaction on Systems, man and Cybernetics. Part A: Systems and Humans vol. 40, No. 3, pp. 596-610, May 1, 2010.
Gall J. et al., "Motion capture using joint skeleton tracking and surface estimation" 2009 IEEE Conference on Computer Vision and Pattern Recognition, pp. 1746-1753, Jun. 20, 2009.
Djamel Merad, et al., "Fast People Counting Using Head Detection from Skeleton Graph", Advanced Video and Signal Based Surveillance, 2010 Seventh IEEE, pp. 233-240, Aug. 29, 2010.
Partial Supplementary European Search Report for corresponding Application No. EP17902112.6, 16 pages, dated Oct. 29, 2020.
Rico, Richter, et al.: "Out of Core Real-time visualization of massive 3D point clouds" Computer Graphics, Virtual REality, Visualization and Interaction in Africa ACM, pp. 121-128, Jun. 21, 2010.
Hanspeter Pfister, et al., "Surfels: Surface Elements as Rendering Perimitives" Siggraph Conference Proceedings 2000, pp. 335-342, Jul. 1, 2000.
Charles Loop, et al., "Real-Time high-resolution sparse voxelization with application to image-based modeling" Proceedings of the 5th High-Performance Graphics Conference, 7 pages, Jan. 1, 2013.
Julius Kammerl, et al., "Real-time compression of point cloud streams" IEEE International Conference on Robotics and Automation (ICRA) 2012 International Conference, pp. 778-785, May 14, 2012.

* cited by examiner

SCALING VOXELS IN A VIRTUAL SPACE

TECHNICAL FIELD

The present invention relates to an information processing apparatus, an information processing method, and a program for drawing how a virtual space in which unit volume elements are arranged looks.

BACKGROUND ART

Recent years have seen research efforts made in technologies such as augmented reality and virtual reality. One of such technologies builds a virtual space on the basis of information acquired from a real space such as images shot with a camera and allows a user to have an experience as if he or she were in the virtual space. According to such a technology, it is possible for the user to have experiences, which would otherwise not be possible in the real world, in the virtual space.

In the above example or the like, unit volume elements called voxels or point clouds are stacked one on top of the other in the virtual space to represent a variety of objects in some cases. By using the unit volume elements, it is possible to reproduce, in the virtual space, various objects without preparing information such as colors and shapes of objects.

SUMMARY

Technical Problems

In the technology described above, the smaller the size of the unit volume elements, the more accurately fine details of a target object can be reproduced. However, the smaller the size of the unit volume elements, the larger the number of unit volume elements required to reproduce the object of the same volume, thus resulting in an increased amount of data to be processed and a higher arithmetic load. Also, the optimal size of the unit volume elements and the number thereof vary depending on the appearance of the object to be reproduced and other factors. Therefore, depending on the size of the unit volume elements, a gap may occur in the object to be reproduced, or an outline thereof may look uneven.

The present invention has been devised in light of the above circumstances, and it is an object of the present invention to provide an information processing apparatus, an information processing method, and a program that can change the size of the unit volume elements to match with the appearance of the object to be reproduced.

Solution to Problems

An information processing apparatus according to the present invention includes: a volume element data acquisition section adapted to acquire, for each of a plurality of unit portions included in an object, volume element data indicating a position in a virtual space where a unit volume element corresponding to the unit portion is to be arranged; a volume element arrangement section adapted to arrange, on a basis of the volume element data, a plurality of the unit volume elements in the virtual space; and a spatial image drawing section adapted to draw a spatial image depicting how the virtual space where the unit volume elements are arranged looks. The volume element arrangement section changes a size of the unit volume elements on a basis of a manner in which the unit volume elements are arranged in the spatial image.

An information processing method according to the present invention includes: a volume element data acquisition step of acquiring, for each of a plurality of unit portions included in an object, volume element data indicating a position in a virtual space where a unit volume element corresponding to the unit portion is to be arranged; a volume element arrangement step of arranging, on a basis of the volume element data, a plurality of the unit volume elements in the virtual space; and
a spatial image drawing step of drawing a spatial image depicting how the virtual space where the unit volume elements are arranged looks. The volume element arrangement step changes a size of the unit volume elements on a basis of a manner in which the unit volume elements are arranged in the spatial image.

A program according to the present invention causes a computer to function as: a volume element data acquisition section adapted to acquire, for each of a plurality of unit portions included in an object, volume element data indicating a position in a virtual space where a unit volume element corresponding to the unit portion is to be arranged; a volume element arrangement section adapted to arrange, on a basis of the volume element data, a plurality of the unit volume elements in the virtual space; and a spatial image drawing section adapted to draw a spatial image depicting how the virtual space where the unit volume elements are arranged looks. The volume element arrangement section changes a size of the unit volume elements on a basis of a manner in which the unit volume elements are arranged in the spatial image. This program may be provided stored in a computer-readable and non-temporal information storage medium.

DESCRIPTION OF EMBODIMENT

A detailed description will be given below of an embodiment of the present invention with reference to drawings.

Figure 1:
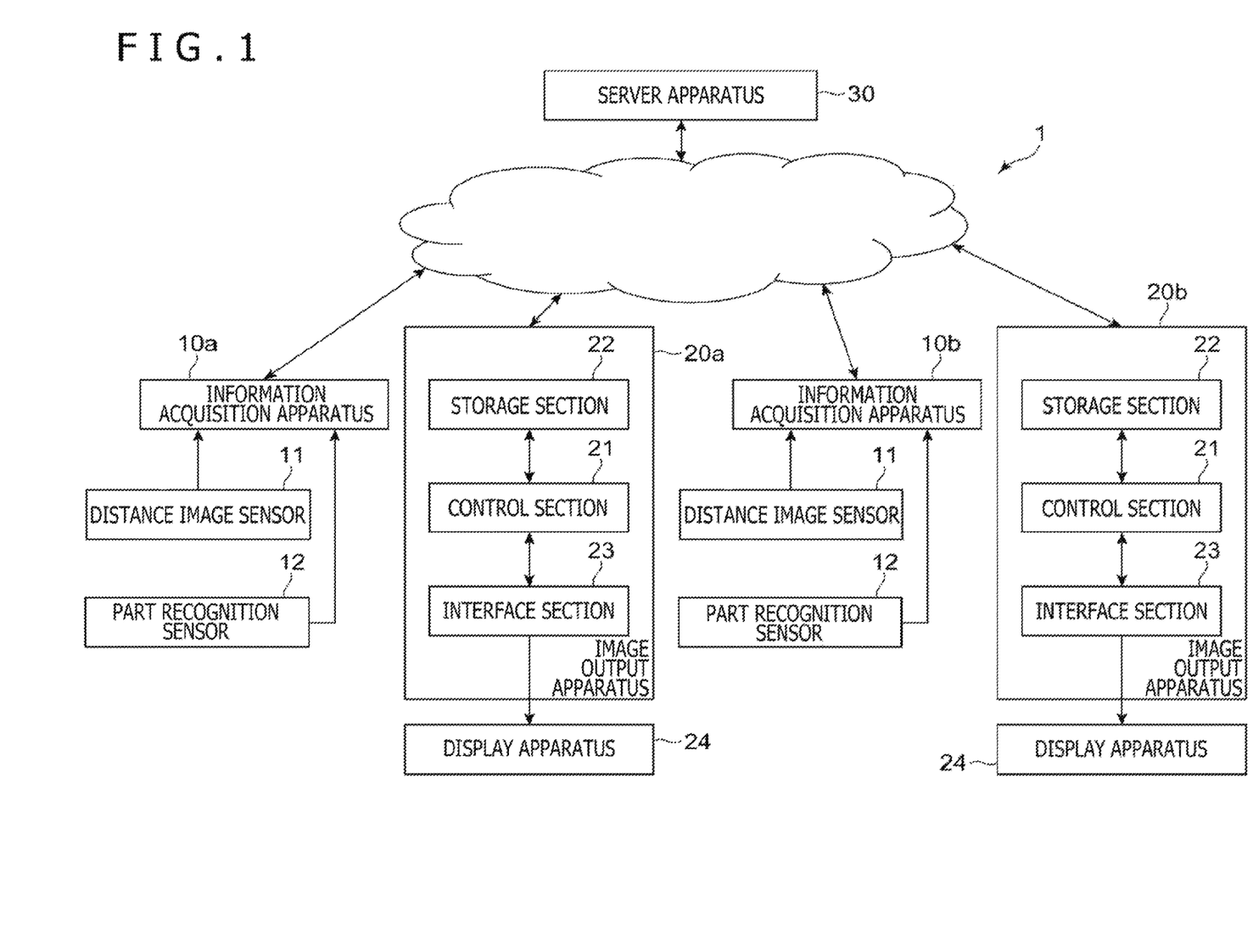
FIG. 1 is a general overview diagram of an information processing system including an information processing apparatus according to an embodiment of the present invention.
Figure 2:
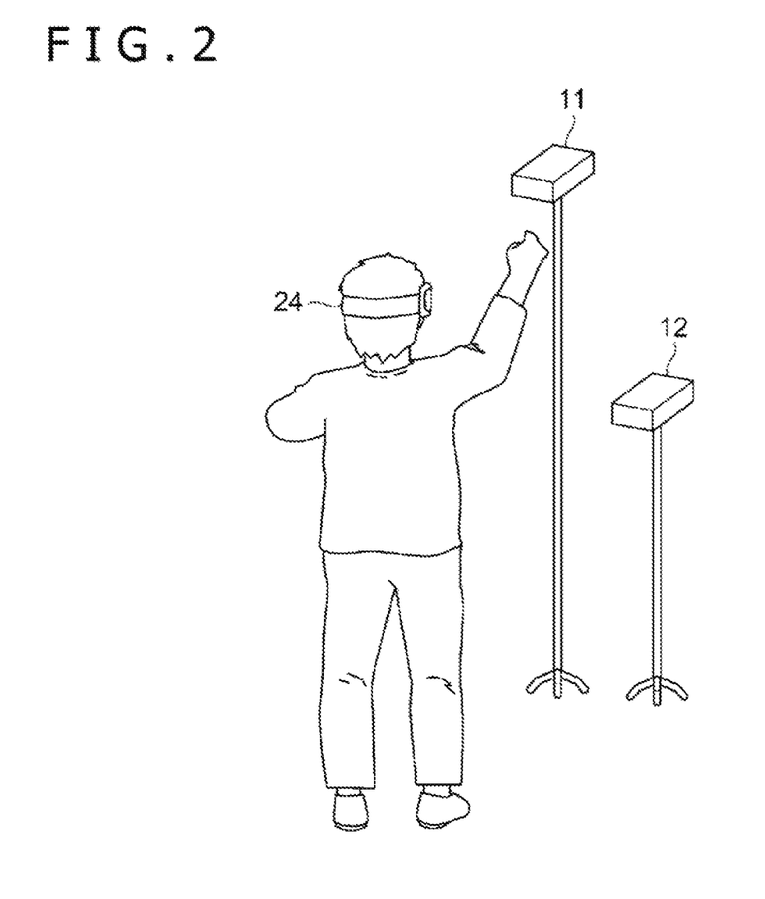
FIG. 2 is a diagram illustrating a manner in which a user uses the information processing system.

FIG. 1 is a general overview diagram of an information processing system 1 including an information processing apparatus according to an embodiment of the present invention. Also, FIG. 2 is a diagram illustrating an example of a manner in which a user uses the information processing system 1. The information processing system 1 is used to build a virtual space in which a plurality of users participate. According to the present information processing system 1, the plurality of users can play games together in the virtual space and communicate with each other.

The information processing system 1 includes a plurality of information acquisition apparatuses 10, a plurality of image output apparatuses 20, and a server apparatus 30 as illustrated in FIG. 1. Of these apparatuses, the image output apparatuses 20 function as information processing apparatuses according to an embodiment of the present invention. In the description given below, we assume, as a specific example, that the information processing system 1 includes the two information acquisition apparatuses 10 and the two image output apparatuses 20. More specifically, the information processing system 1 includes an information acquisition apparatus 10a and an image output apparatus 20a used by a first user. Also, the information processing system 1 includes an information acquisition apparatus 10b and an image output apparatus 20b used by a second user.

Each of the information acquisition apparatuses 10 is an information processing apparatus such as a personal computer or a home gaming console and connected to a distance image sensor 11 and a part recognition sensor 12.

The distance image sensor 11 acquires information required to generate a distance image (depth map) by observing how a real space including the users of the information acquisition apparatuses 10 looks. For example, the distance image sensor 11 may be a stereo camera that includes a plurality of cameras arranged horizontally side by side. The information acquisition apparatus 10 acquires images shot with the plurality of cameras, thus generating a distance image on the basis of the shot images. Specifically, the information acquisition apparatus 10 can calculate the distance from a shooting position (observation point) of the distance image sensor 11 to a subject appearing in the shot images by taking advantage of parallax of the plurality of cameras. It should be noted that the distance image sensor 11 is not limited to a stereo camera and may be a sensor capable of measuring the distance to the subject by TOF or another scheme, for example.

A distance image is an image that includes, in each unit region included in a field of view, information indicating the distance to the subject appearing in the unit region. As illustrated in FIG. 2, the distance image sensor 11 is installed in such a manner as to point to a person (user) in the present embodiment. Therefore, the information acquisition apparatus 10 can calculate, in a real space, position coordinates of each of a plurality of unit portions of a user's body appearing in the distance image by using a detection result of the distance image sensor 11.

Here, a unit portion refers to a portion of the user's body included in an individual spatial region acquired by partitioning the real space into lattices of a predetermined size. The information acquisition apparatus 10 identifies the position of a unit portion included in the user's body in the real space on the basis of distance information to the subject included in the distance image. Also, the information acquisition apparatus 10 identifies a color of the unit portion from a pixel value of the shot image corresponding to the distance image. This allows the information acquisition apparatus 10 to acquire data representing the positions and colors of the unit portions included in the user's body. Data identifying the unit portions included in the user's body will be hereinafter referred to as unit portion data. As will be described later, it is possible to reproduce the user in the virtual space with the same posture and appearance as in the real space by arranging a unit volume element corresponding to each of the plurality of unit portions in the virtual space. It should be noted that the smaller the size of the unit portions, the higher the resolution at the time of reproduction of the user in the virtual space, thus providing closer-to-real reproduction.

The part recognition sensor 12 acquires information required to identify the position of the user's body part by observing the user as does the distance image sensor 11. Specifically, the part recognition sensor 12 may be a camera or the like used for known bone tracking technique. Also, the part recognition sensor 12 may include a member mounted on the user's body, a sensor for tracking the position of a display apparatus 24 which will be described later, or another device.

The information acquisition apparatus 10 acquires data regarding the position of each part included in the user's body by analyzing the detection results of the part recognition sensor 12. Data regarding the positions of the parts included in the user's body will be hereinafter referred to as body part data. For example, body part data may be data that identifies the position and orientation of each bone at the time of representation of the user's posture with a bone model. Also, body part data may be data that identifies the position and orientation of only a portion of the user's body such as user's head or hand.

The information acquisition apparatus 10 calculates, every given time period and on the basis of the detection results of the distance image sensor 11 and the part recognition sensor 12, unit portion data and body part data and sends these pieces of data to the server apparatus 30. It should be noted that coordinate systems used in these pieces of data to identify the positions of unit portions and body parts must match. For this reason, we assume that the information acquisition apparatus 10 acquires, in advance, information representing the positions of respective observation points of the distance image sensor 11 and the part recognition sensor 12 in the real space. By converting coordinates using position information of the observation points, the information acquisition apparatus 10 can calculate unit portion data and body part data that represent the position of each unit portion and each body part of the user by using a matching coordinate system.

It should be noted that we assume, in the description given above, that the single distance image sensor 11 and the single part recognition sensor 12 are connected to the single information acquisition apparatus 10. However, the present invention is not limited thereto, and the plurality of single distance image sensors 11 and the plurality of single part recognition sensors 12 may be connected to the information acquisition apparatus 10. For example, if two or more distance image sensor 11 are arranged in such a manner as to surround the user, the information acquisition apparatus 10 can acquire, by integrating information acquired from these sensors, unit portion data over a wider area of the user's body surface. Also, more accurate body part data can be acquired by combining the detection results of the plurality of part recognition sensors 12. Also, the distance image sensor 11 and the part recognition sensor 12 may be realized by a single device. In this case, the information acquisition apparatus 10 generates each piece of unit portion data and body part data by analyzing the detection result of this single device.

Each of the image output apparatuses 20 is an information processing apparatus such as a personal computer or a home gaming console and includes a control section 21, a storage section 22, and an interface section 23 as illustrated in FIG. 1. Also, the image output apparatus 20 is connected to the display apparatus 24.

The control section 21 includes at least a processor and performs a variety of information processing tasks by executing a program stored in the storage section 22. A specific example of a process performed by the control section 21 in the present embodiment will be described later. The storage section 22 includes at least a memory device such as a random access memory (RAM) and stores the program executed by the control section 21 and data processed by the program. The interface section 23 is an interface for the image output apparatus 20 to supply a video signal to the display apparatus 24.

The display apparatus 24 displays video to match with a video signal supplied from the image output apparatus 20. We assume, in the present embodiment, that the display apparatus 24 is a head mounted display apparatus worn on the head by the user for use such as head mounted display. We assume that the display apparatus 24 displays, in front of left and right eyes of the user, left and right eye images different from each other. This allows the display apparatus 24 to display a stereoscopic image by taking advantage of parallax.

The server apparatus 30 arranges, on the basis of data received from each of the plurality of information acquisition apparatuses 10, unit volume elements representing the user, other objects, and so on in a virtual space. Also, behaviors of objects arranged in the virtual space are calculated through arithmetic processing such as physics calculations. Then, information regarding positions and shapes of the objects arranged in the virtual space acquired as a result thereof is sent to the plurality of image output apparatuses 20.

More specifically, the server apparatus 30 determines, on the basis of unit portion data received from the information acquisition apparatus 10a, an arrangement position of a unit volume element corresponding to each of a plurality of unit portions included in the unit portion data in the virtual space. Here, unit volume elements are a type of objects arranged in the virtual space and have the same size. Unit volume elements may be of a predetermined shape such as cube. Also, a color of each unit volume element is determined to match with the color of the unit portion. In the description given below, this unit volume element will be denoted as a voxel.

The arrangement position of each voxel is determined to match with the position of the corresponding unit portion in the real space and a reference position of the user. Here, the user's reference position is a position used as a reference for arranging the user and may be a predetermined position in the virtual space. By the voxels arranged as described above, the posture and appearance of the first user existing in the real space are reproduced in the virtual space in an 'as-is' manner. In the description given below, data that identifies a group of voxels for reproducing the first user in the virtual space will be referred to as first voxel data. This first voxel data is data that represents the position and color of each voxel in the virtual space. Also, in the description given below, an object representing the first user that includes a set of voxels included in the first voxel data will be denoted as a first user object U1.

It should be noted that the server apparatus 30 may refer to body part data when determining the arrangement position of each voxel in the virtual space. It is possible to identify the position of a user's toe that is assumed to be in contact with a floor by referring to bone model data included in the body part data. By aligning this position with the user's reference position, it is possible to ensure that a height of the voxel arrangement position from a floor in the virtual space coincides with the height of the corresponding unit portion from the floor in the real space. It should be noted that we assume here that the user's reference position is set on a ground in the virtual space.

As with the processes performed on the first user, the server apparatus 30 determines, on the basis of unit portion data received from the information acquisition apparatus 10b, the arrangement position of the voxel corresponding to each of the plurality of unit portions included in the unit portion data in the virtual space. By the voxels arranged as described above, the posture and appearance of the second user is reproduced in the virtual space. In the description given below, data that identifies a group of voxels for reproducing the second user in the virtual space will be referred to as second voxel data. Also, in the description given below, an object representing the second user that includes a set of voxels included in the second voxel data will be denoted as a second user object U2.

Also, the server apparatus 30 arranges an object to be manipulated by the users in the virtual space and calculates its behavior. As a specific example, we assume that two users play a game in which they hit a ball. The server apparatus 30 determines the reference position of each user in the virtual space such that the two users face each other and determines the arrangement position of the voxel group included in each user's body as described above on the basis of this reference position. Also, the server apparatus 30 arranges a ball object B to be manipulated by the two users in the virtual space.

Figure 3:
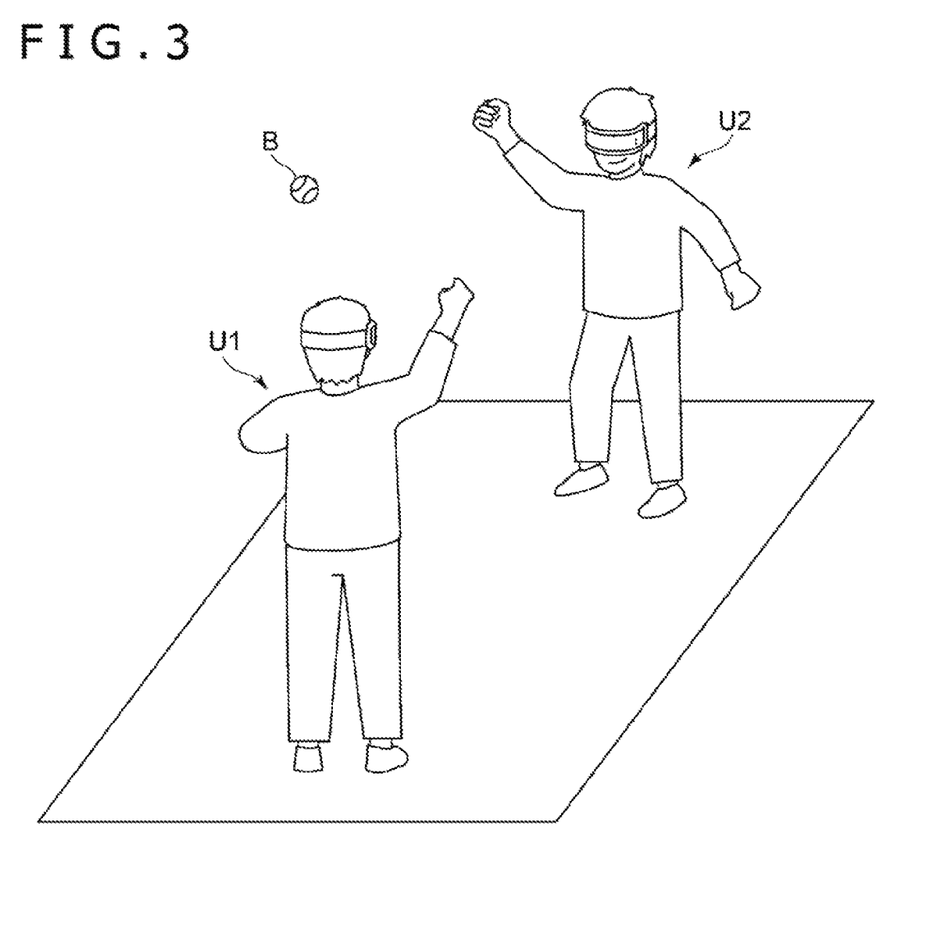
FIG. 3 is a diagram illustrating an example of how a virtual space looks.

Further, the server apparatus 30 calculates the ball behavior in the virtual space through physics calculations. Also, the server apparatus 30 decides whether contact occurs between each user's body and the ball by using the body part data received from each of the information acquisition apparatuses 10. Specifically, in the case where the position where the user's body exists in the virtual space overlaps the position of the ball object B, the server apparatus 30 decides that the ball has come into contact with the user and calculates the behavior when the ball is reflected by the user. A motion of the ball in the virtual space calculated as described above is displayed on the display apparatus 24 by each of the image output apparatuses 20 as will be described later. Each user can hit back the ball flying toward him or her with the hand by moving his or her body while viewing what is displayed. FIG. 3 illustrates how the ball object B and the user objects, each of which represents each user, arranged in the virtual space in this example, look. It should be noted that, in the example depicted in this figure, a distance image is shot not only from the front side but also from the back side of each user and that the voxels representing the back of each user are arranged in response thereto.

The server apparatus 30 sends, to each of the image output apparatuses 20, voxel data of each user determined by the processes described above and object data representing the positions and shapes of other objects every given time period. It should be noted that the server apparatus 30 may reduce the number of voxels included in the voxel data of each user or a frequency for sending voxel data in order to suppress a communication traffic between the server apparatus 30 and the image output apparatus 20. Specifically, for example, the server apparatus 30 thins out some of the voxels included in body parts of low importance such that the number of voxels per unit volume is reduced. Alternatively, the server apparatus 30 reduces the frequency for sending voxel data for the voxels included in the body parts of low importance as compared to the voxels included in the other parts. Here, the body parts of low importance may be determined to match with contents of processes. For example, in the case where each user engages in a sport in a virtual space by moving his or her body, the hands, feet, and other parts that move significantly are important, and the face and a torso are relatively less important. On the other hand, in an application that permits users to communicate with each other, the head may be a highly important part whereas other parts may be of low importance.

Figure 4:
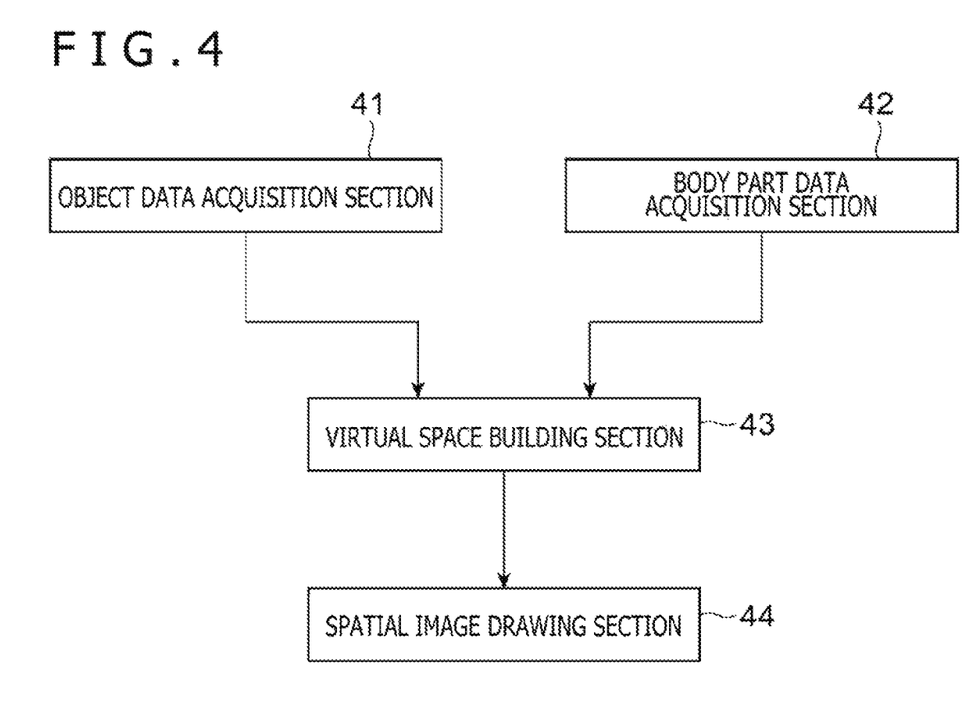
FIG. 4 is a functional block diagram illustrating functions of the information processing apparatus according to the embodiment of the present invention.

A description will be given below of functions realized by each of the image output apparatuses 20 in the present embodiment on the basis of FIG. 4. As illustrated in FIG. 4, the image output apparatus 20 functionally includes an object data acquisition section 41, a body part data acquisition section 42, a virtual space building section 43, and a spatial image drawing section 44. These functions are realized as a result of execution of the program stored in the storage section 22 by the control section 21. This program may be provided to the image output apparatus 20 via a communication network such as the Internet or may be provided stored in a computer-readable information storage medium such as optical disc. It should be noted that although a description will be given below of the functions realized by the image output apparatus 20a used by the first user as a specific example, we assume that similar functions are realized by the image output apparatus 20b although the target user is different.

The object data acquisition section 41 acquires data representing the position and shape of each object to be arranged in the virtual space by receiving the data from the server apparatus 30. The data acquired by the object data acquisition section 41 includes voxel data of each user and object data of the ball object B. These pieces of object data include information regarding the shape of each object, the position in the virtual space, the surface color, and other information. It should be noted that voxel data need not necessarily include information representing which user each voxel represents. That is, the first voxel data and the second voxel data may be sent from the server apparatus 30 to each of the image output apparatuses 20 as voxel data representing, altogether, the contents of the voxels arranged in the virtual space in a manner not distinguishable one from the other.

Also, the object data acquisition section 41 may acquire, from the server apparatus 30, a background image representing the background of the virtual space. The background image in this case may be, for example, a panoramic image representing a scenery over a wide area through an equirectangular projection format or another format.

The body part data acquisition section 42 acquires body part data of each user sent from the server apparatus 30. Specifically, the body part data acquisition section 42 receives the body part data of the first user and the body part data of the second user respectively from the server apparatus 30.

The virtual space building section 43 builds the contents of the virtual space to be presented to the users. Specifically, the virtual space building section 43 builds the virtual space by arranging each object included in the object data acquired by the object data acquisition section 41 at a specified position in the virtual space.

Here, the voxels included respectively in the first voxel data and the second voxel data are included in the objects arranged by the virtual space building section 43. As described earlier, the positions of these voxels in the virtual space are determined by the server apparatus 30 on the basis of the positions of the corresponding unit portions of the user's body in the real space. For this reason, the actual posture and appearance of each user are reproduced by the set of voxels arranged in the virtual space. Also, the virtual space building section 43 may arrange, around the user object in the virtual space, objects having the background image attached as a texture. This causes the scenery included in the background image to be included in the spatial image which will be described later.

Further, the virtual space building section 43 changes the size of voxels to be arranged to match with a given condition. The reason for this is that the optimal voxel size varies depending on the appearance of the user object reproduced by the voxel when the spatial image drawing section 44 which will be described later draws a spatial image. Specifically, the apparent size of the opponent user changes between when the opponent user is close and when the opponent user is far in the virtual space. For this reason, if the voxel size is constant, the voxels may be too large and cause the outline of the opponent user's body to look uneven, or conversely, too small and cause the outline to look as if there were a gap. Also, in the case where the voxels included in a specific part of the opponent user's body are thinned out as described earlier, a voxel density drops if the voxels are left as-is, occasionally causing the user body to look as if there were a gap. It is possible to prevent such an unnatural appearance by properly adjusting the voxel size. A description will be given later of a specific example of a process for changing the voxel size.

The spatial image drawing section 44 draws a spatial image representing how the virtual space built by the virtual space building section 43 looks. Specifically, the spatial image drawing section 44 sets a view point at the position in the virtual space corresponding to the position of eyes of the user (first user here) to whom the image is to be presented and draws how the virtual space as viewed from that view point looks. The spatial image drawn by the spatial image drawing section 44 is displayed on the display apparatus 24 worn by the first user. This allows the first user to view how the virtual space where the first user object U1 representing the body of himself or herself, the second user object U2 representing the body of the second user, and the ball object B are arranged looks.

The processes performed by each of the information acquisition apparatuses 10, the image output apparatuses 20, and the server apparatus 30 described above are repeated every given time period. The given time period in this case may be, for example, time corresponding to a frame rate of video displayed on the display apparatus 24. This allows each user to view how the user objects that are updated by reflecting, in real time, his or her own motion and the motion of the opponent user in the virtual space look.

A description will be given below of a specific example of a process for changing the size of voxels arranged by the virtual space building section 43. When arranging voxels first, the virtual space building section 43 arranges each voxel in such a manner that the voxel has a predetermined standard size. Then, the spatial image drawing section 44 draws how the virtual space where the voxels are arranged looks. At this time, the virtual space building section 43 acquires information regarding the manner in which the voxels are arranged in a drawn spatial image. Then, when arranging the voxels next time, the virtual space building section 43 changes the size of the voxels on the basis of the acquired information.

Figure 5:
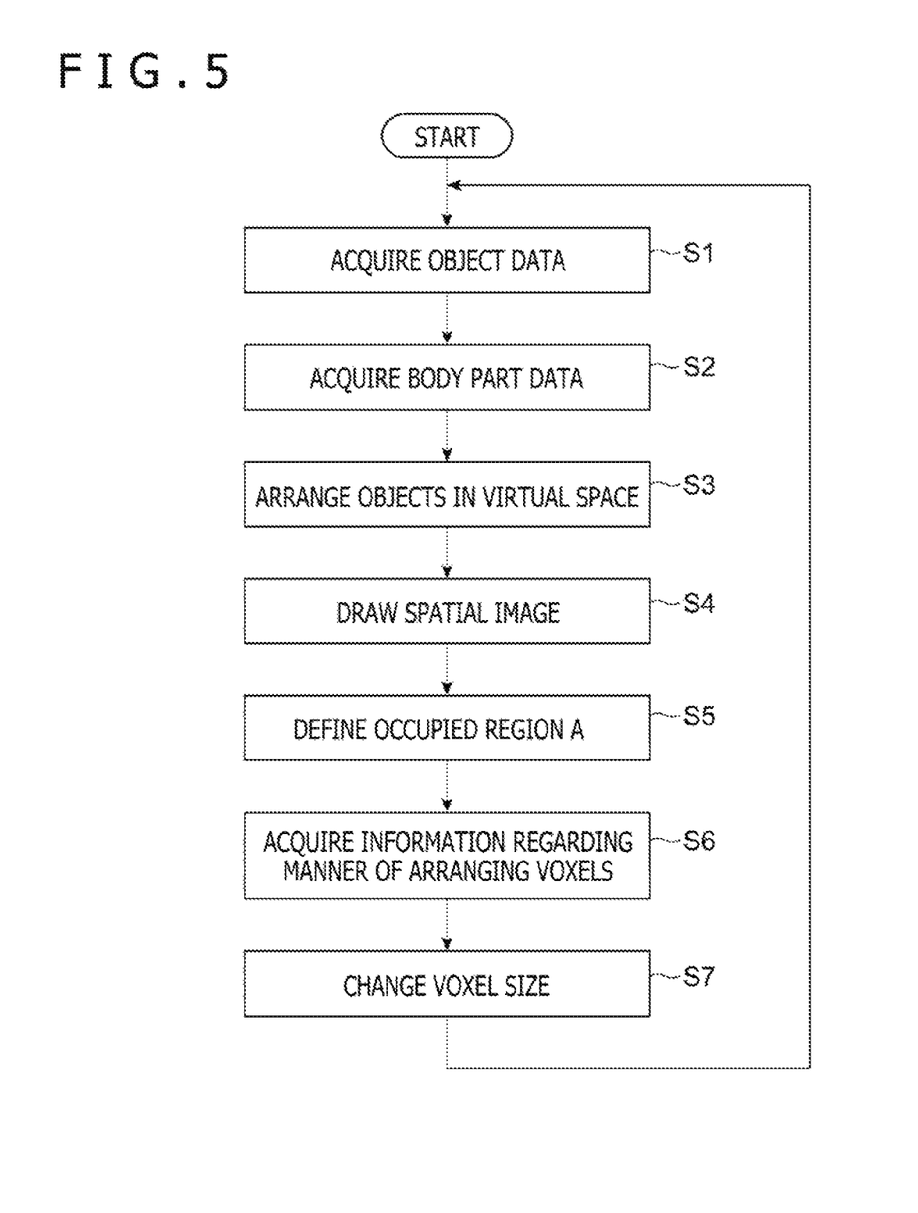
FIG. 5 is a flowchart illustrating an example of flow of processes performed by the information processing apparatus according to the embodiment of the present invention.

A description will be given of this flow of processes with reference to the flowchart illustrated in FIG. 5. First, the object data acquisition section 41 acquires object data from the server apparatus 30 (step S1). Further, the body part data acquisition section 42 acquires body part data from the server apparatus 30 (step S2).

Thereafter, the virtual space building section 43 arranges a variety of objects in the virtual space on the basis of the object data received in step S1 (step S3). The objects arranged at this time include the voxels representing the first user and the second user, respectively. We assume here that each of the voxels has a predetermined standard size. It should be noted that in the case where the frequency for sending some of the voxels has been reduced as described earlier, the virtual space building section 43 may arrange the voxels by using voxel information received before. Also, even in the case where data regarding all the voxels has been received from the server apparatus 30, the virtual space building section 43 may thin out the voxels for the body parts of low importance and arrange only some of the voxels in the virtual space.

Thereafter, the spatial image drawing section 44 draws a spatial image representing how the inside of the virtual space where a variety of objects were arranged in step S3 looks and causes the display apparatus 24 to display the spatial image (step S4).

Figure 6:
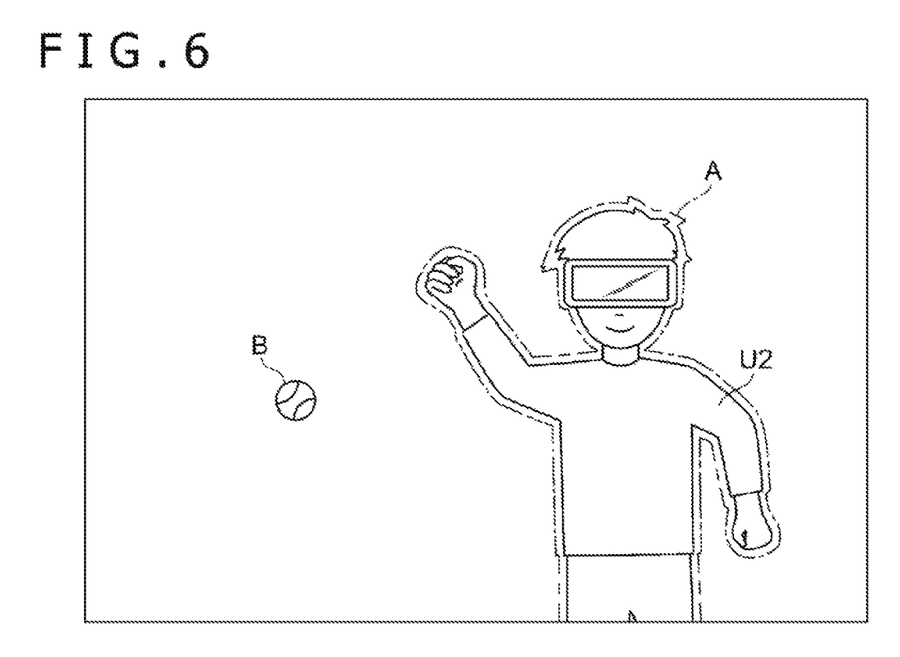
FIG. 6 is a diagram illustrating an example of an occupied region.

Then, the virtual space building section 43 defines a region occupied by the user object in the spatial image (hereinafter referred to as an occupied region A) (step S5). Specifically, the virtual space building section 43 may define the region occupied by the user object in the spatial image on the basis of the user position and size determined by the body part data acquired in step S2. Alternatively, a region including the voxels actually arranged in the spatial image may be defined as the occupied region A on the basis of the position of each of the voxels in the spatial image. FIG. 6 illustrates a specific example of the occupied region A in the spatial image.

Further, the virtual space building section 43 acquires information regarding the manner in which the voxels are arranged in the occupied region A defined in step S5 (step S6). Specifically, for example, the virtual space building section 43 calculates a voxel density in the occupied region A (i.e., the number of voxels per unit area). Then, the virtual space building section 43 changes the voxel size to match with the acquired information (step S7). Specifically, in the case where the voxel density is high in the occupied region A, the voxel size is reduced. Conversely, in the case where the density is low, the voxel size is increased. This allows the voxel size to be adjusted properly to match with the user object size in the spatial image.

Thereafter, the process returns to step S1, and a next spatial image is drawn. When step S3 is performed next time, the voxels are arranged to have the size changed in step S7, which is previously performed.

It should be noted that when changing the voxel size in step S7, the virtual space building section 43 may change the voxel size step by step rather than changing the voxel size to a large extent at a stroke to match with the current voxel density. This prevents a drastic change in the appearance of the user object.

Also, the virtual space building section 43 may identify, in step S6, the presence or absence of a gap region where no voxels are arranged in the occupied region A and/or the size thereof rather than the voxel density. In the case where the voxel is too small for the occupied region A, a gap may occur in the occupied region A, possibly causing what would otherwise be invisible behind the user object to become visible. In the case where it is decided in step S6 that a gap region exists, the virtual space building section 43 increases the voxel size in step S7 to prevent the occurrence of such a gap. Also, the virtual space building section 43 may increase the voxel size to match with the size of the gap region that exists. This makes it less likely for a gap to occur in the occupied region A when a spatial image is drawn next time.

When drawing a spatial image, the virtual space building section 43 may use a Z buffer for storing depth information to identify the manner in which the voxels are arranged in the occupied region A. It is possible to readily identify a gap region where no voxels are drawn in the occupied region A by identifying locations where voxels are drawn when depth information is stored in the Z buffer.

It should be noted that the virtual space building section 43 may define, in step S5, the occupied region A occupied by the user object in the spatial image for each user whose voxels are arranged in the virtual space. For example, in the virtual space building section 43 of the image output apparatus 20a, the user object U1 representing the first user himself or herself who is viewing the spatial image and the user object U2 representing the second user differ greatly in distance from the view point, thus causing these objects to appear differently. For this reason, the virtual space building section 43 defines the occupied region A for each user and acquires, for each of the occupied regions A defined, information regarding the manner in which the voxels included therein are arranged. Then, the virtual space building section 43 changes, for each user, the voxel size for next arrangement. This makes it possible to adjust, to their suitable sizes, the voxels representing the body of the user himself or herself who appears close and the voxels representing the opponent user who appears relatively far.

Further, the virtual space building section 43 may change, for each part included in each user's body, the voxel size representing that part. In this case, the virtual space building section 43 defines, for each of the body parts such as head, torso, hands, and feet, the occupied region A occupied by that part in the spatial image with reference to the body part data. Then, the virtual space building section 43 changes, for each of the occupied regions A occupied by each of the parts, the voxel size to match with the manner in which the voxels included therein are arranged. This makes it possible to adjust the voxel to its suitable size for each part such as a head or a torso.

As has been described above, the image output apparatus 20 according to the present embodiment can adjust the voxel size properly by changing the voxel size to match with the manner in which the voxels are arranged in the spatial image.

It should be noted that embodiments of the present invention are not limited to that described above. For example, although two users were reproduced by voxels in a virtual space as a specific example in the description given above, one user or three or more users may be reproduced. Also, in the case where voxels representing a plurality of users are arranged at the same time in a virtual space, each user may be present at a physically remote position as long as the information acquisition apparatus 10 and the image output apparatus 20 used by each user are connected to the server apparatus 30 via a network. Also, not only persons but also a variety of objects existing in the real space may be reproduced by voxels. Further, in the description given above, voxel data was generated in real time on the basis of information acquired by observing the real space with the distance image sensor 11. However, the present invention is not limited thereto, and voxel data may be prepared in advance on the basis of the shape and color of the object to be reproduced.

Also, users other than those to be reproduced in a virtual space may view how the virtual space looks. In this case, the server apparatus 30 draws a spatial image indicating how the inside of the virtual space looks as seen from a given view point aside from data to be sent to each of the image output apparatuses 20 and delivers the spatial image as streaming video. By viewing this video, other users not reproduced in the virtual space may view how the inside of the virtual space looks.

Also, not only user objects that reproduce users and objects to be manipulated by the user objects but also an object included in a background and various other objects may be arranged in the virtual space. Also, a shot image acquired by shooting how the real space looks may be attached to an object (e.g., screen) in the virtual space. This allows each user who is viewing how the inside of the virtual space looks with the display apparatus 24 to view how a real world looks at the same time.

Also, at least some of the processes to be performed by the image output apparatuses 20 in the description given above may be realized by the server apparatus 30 or another apparatus. As a specific example, the server apparatus 30 may build a virtual space on the basis of each user's body part data and unit portion data and generate a spatial image drawn to depict how the inside thereof looks. In this case, the server apparatus 30 individually controls the arrangement of voxels for each user to whom a spatial image is to be delivered and individually draws the spatial image. That is, the server apparatus 30 builds, for the first user, a virtual space in which no voxel is arranged in the head region of the first user and draws a spatial image representing how the inside thereof looks. Also, when generating a spatial image for the second user, the server apparatus 30 builds a virtual space in which no voxel is arranged in the head region of the second user. Then, the respective spatial images are delivered respectively to the corresponding image output apparatuses 20.

Also, although the information acquisition apparatus 10 and the image output apparatus 20 were independent of each other in the description given above, a single information processing apparatus may realize the functions of both of the information acquisition apparatus 10 and the image output apparatus 20.

REFERENCE SIGNS LIST

1 Information processing system, 10 Information acquisition apparatus, 11 Distance image sensor, 12 Part recognition sensor, 20 Image output apparatus, 21 Display apparatus, 22 Control section, 22 Storage section, 23 Interface section, 30 Server apparatus, 41 Object data acquisition section, 42 Body part data acquisition section, 43 Virtual space building section, 44 Spatial image drawing section.

The invention claimed is:

1. An information processing apparatus comprising:
a volume element data acquisition section adapted to acquire, for each of a plurality of unit portions included in an object, volume element data indicating a position in a virtual space where a plurality of unit volume elements corresponding to the unit portion is to be arranged;
a volume element arrangement section adapted to arrange in an arrangement, on a basis of the volume element data, one or more of the unit volume elements in the virtual space; and
a spatial image drawing section adapted to draw a spatial image depicting how the virtual space where the arranged unit volume elements are arranged looks, wherein
for each of the unit portions, the volume element arrangement section changes a density of the unit volume elements of the unit portion depending on the importance of the unit portion, and changes a size of the arranged unit volume elements of the unit portion depending on the density of the arranged unit volume elements of the unit portion, such that a size of at least one of the arranged unit volume elements is different than a size of at least one other of the arranged unit volume elements;
changing the density is accomplished by including in or excluding from the arrangement the unit volume elements, of the unit portion, for which volume element data has been acquired, by, with regard to at least one unit volume element, including it in the arrangement by determining to arrange it in the virtual space, and with regard to at least one other unit volume element, excluding it in the arrangement by determining to not arrange it in the virtual space;
changing the size is accomplished by increasing or decreasing the size of the arranged unit volume elements by, for unit portions having low density of the arranged unit volume elements, increasing the size of the arranged unit volume elements, and for unit portions having high density of the arranged unit volume elements, decreasing the size of the arranged unit volume elements;
for each arranged unit volume element undergoing a size change, changing the size includes changing the size, from an initial size to a size matching the changed unit volume element density of the unit portion to which the arranged unit volume element belongs, incrementally step by step through interim sizes; and
the importance of the unit portion is determined in accordance with contents of game processes by which a user engages, in the virtual space, in a first game activity requiring movement of body parts of the user and a second game activity requiring communication between game players,
the importance of the unit portion being determined in the first game activity by a greater amount of movement required for the game of a body part, of the user, to which the unit portion is associated, in contrast to a lesser amount of movement required for the game by other body parts of the user,
the importance of the unit portion being determined in the second game activity by a greater usefulness for communication required for the game of a body part, of the user, amount of movement required for the game of a body part, of the user, to which the unit portion is associated in contrast to a lesser usefulness for communication required for the game by other body parts of the user.

2. The information processing apparatus of claim 1, wherein the volume element arrangement section identifies an occupied region occupied by the object in the spatial image and changes the size of the unit volume element on a basis of a manner in which the unit volume elements are arranged in the occupied region.

3. The information processing apparatus of claim 2, wherein the volume element arrangement section changes the size of the unit volume element to match with a density of the unit volume elements arranged in the occupied region.

4. The information processing apparatus of claim 2, wherein the volume element arrangement section changes the size of the unit volume element to match with whether or not there is a gap region where the unit volume elements are not arranged in the occupied region.

5. The information processing apparatus of claim 2, wherein
the object is a person,
the information processing apparatus further comprises a body part data acquisition section adapted to acquire body part data indicating positions of body parts included in the person, and
the volume element arrangement section identifies the occupied region occupied by the person in the spatial image on a basis of the body part data.

6. An information processing method comprising:
acquiring, for each of a plurality of unit portions included in an object, volume element data indicating a position in a virtual space where a plurality of unit volume elements corresponding to the unit portion is to be arranged;
arranging in an arrangement, on a basis of the volume element data, one or more of the unit volume elements in the virtual space; and
drawing a spatial image depicting how the virtual space where the arranged unit volume elements are arranged looks,
wherein
for each of the unit portions, the arranging changes a density of the unit volume elements of the unit portion depending on the importance of the unit portion, and changes a size of the arranged unit volume elements of the unit portion depending on the density of the arranged unit volume elements of the unit portion, such that a size of at least one of the arranged unit volume elements is different than a size of at least one other of the arranged unit volume elements;
changing the density is accomplished by including in or excluding from the arrangement the unit volume elements, of the unit portion, for which volume element data has been acquired, by, with regard to at least one unit volume element, including it in the arrangement by determining to arrange it in the virtual space, and with regard to at least one other unit volume element, excluding it in the arrangement by determining to not arrange it in the virtual space;
changing the size is accomplished by increasing or decreasing the size of the arranged unit volume elements by, for unit portions having low density of the arranged unit volume elements, increasing the size of the arranged unit volume elements, and for unit portions having high density of the arranged unit volume elements, decreasing the size of the arranged unit volume elements;
for each arranged unit volume element undergoing a size change, changing the size includes changing the size, from an initial size to a size matching the changed unit volume element density of the unit portion to which the arranged unit volume element belongs, incrementally step by step through interim sizes; and
the importance of the unit portion is determined in accordance with contents of game processes by which a user engages, in the virtual space, in a first game activity requiring movement of body parts of the user and a second game activity requiring communication between game players,
the importance of the unit portion being determined in the first game activity by a greater amount of movement required for the game of a body part, of the user, to which the unit portion is associated, in contrast to a lesser amount of movement required for the game by other body parts of the user,
the importance of the unit portion being determined in the second game activity by a greater usefulness for communication required for the game of a body part, of the user, amount of movement required for the game of a body part, of the user, to which the unit portion is associated in contrast to a lesser usefulness for communication required for the game by other body parts of the user.

7. A non-transitory, computer readable storage medium containing a computer program, which when executed by a computer, causes the computer to carry out actions, comprising:
acquiring, for each of a plurality of unit portions included in an object, volume element data indicating a position in a virtual space where a plurality of unit volume elements corresponding to the unit portion is to be arranged;
arranging in an arrangement, on a basis of the volume element data, one or more of the unit volume elements in the virtual space; and
drawing a spatial image depicting how the virtual space where the arranged unit volume elements are arranged looks,
wherein
for each of the unit portions, the arranging changes a density of the unit volume elements of the unit portion depending on the importance of the unit portion, and changes a size of the arranged unit volume elements of the unit portion depending on the density of the arranged unit volume elements of the unit portion, such that a size of at least one of the arranged unit volume elements is different than a size of at least one other of the arranged unit volume elements;
changing the density is accomplished by including in or excluding from the arrangement the unit volume elements, of the unit portion, for which volume element data has been acquired, by, with regard to at least one unit volume element, including it in the arrangement by determining to arrange it in the virtual space, and with regard to at least one other unit volume element, excluding it in the arrangement by determining to not arrange it in the virtual space;
changing the size is accomplished by increasing or decreasing the size of the arranged unit volume elements by, for unit portions having low density of the arranged unit volume elements, increasing the size of the arranged unit volume elements, and for unit portions having high density of the arranged unit volume elements, decreasing the size of the arranged unit volume elements;
for each arranged unit volume element undergoing a size change, changing the size includes changing the size, from an initial size to a size matching the changed unit volume element density of the unit portion to which the arranged unit volume element belongs, incrementally step by step through interim sizes; and
the importance of the unit portion is determined in accordance with contents of game processes by which a user engages, in the virtual space, in a first game activity requiring movement of body parts of the user and a second game activity requiring communication between game players,
the importance of the unit portion being determined in the first game activity by a greater amount of movement required for the game of a body part, of the user, to which the unit portion is associated, in contrast to a lesser amount of movement required for the game by other body parts of the user, the importance of the unit portion being determined in the second game activity by a greater usefulness for communication required for the game of a body part, of the user, amount of movement required for the game of a body part, of the user, to which the unit portion is associated in contrast to a lesser usefulness for communication required for the game by other body parts of the user.

* * * * *